US012692362B2

(12) United States Patent
Sà et al.

(10) Patent No.: US 12,692,362 B2
(45) Date of Patent: Jul. 28, 2026

(54) SULFUR-CROSSLINKABLE RUBBER COMPOSITION COMPRISING A GRAFT COPOLYMER

(71) Applicant: Continental Reifen Deutschland GmbH, Hannover (DE)

(72) Inventors: Catarina Sà, Isernhagen (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 534 days.

(21) Appl. No.: 18/251,146

(22) PCT Filed: Oct. 19, 2021

(86) PCT No.: PCT/EP2021/078975

§ 371 (c)(1),
(2) Date: Apr. 28, 2023

(87) PCT Pub. No.: WO2022/090006

PCT Pub. Date: May 5, 2022

(65) Prior Publication Data

US 2023/0399488 A1 Dec. 14, 2023

(30) Foreign Application Priority Data

Oct. 28, 2020 (EP) .................................... 20204276

(51) Int. Cl.

| | |
|---|---|
| ***C08K 3/06*** | (2006.01) |
| ***B60C 1/00*** | (2006.01) |
| ***C08F 2/38*** | (2006.01) |
| ***C08F 212/08*** | (2006.01) |
| ***C08F 220/34*** | (2006.01) |
| ***C08K 3/04*** | (2006.01) |
| ***C08K 3/36*** | (2006.01) |
| ***C08L 7/00*** | (2006.01) |
| ***C08L 9/06*** | (2006.01) |
| ***C08L 51/04*** | (2006.01) |

(52) U.S. Cl.

CPC .............. *C08K 3/06* (2013.01); *B60C 1/0016* (2013.01); *C08F 2/38* (2013.01); *C08F 212/08* (2013.01); *C08F 220/34* (2013.01); *C08K 3/04* (2013.01); *C08K 3/36* (2013.01); *C08L 7/00* (2013.01); *C08L 9/06* (2013.01); *C08L 51/04* (2013.01); *C08F 2438/03* (2013.01)

(58) Field of Classification Search

CPC .... C08K 3/06; C08K 3/04; C08K 3/36; C08L 9/06; C08L 51/04; C08F 2/38; C08F 212/08; C08F 220/34

USPC .......................................................... 524/418

See application file for complete search history.

(56) References Cited

U.S. PATENT DOCUMENTS

| | | | |
|---|---|---|---|
| 10,273,351 B2 | 4/2019 | Pavon Sierra et al. | |
| 2002/0183473 A1* | 12/2002 | Matyjaszewski ... | C08F 290/046 526/135 |
| 2010/0184922 A1 | 7/2010 | Kwag et al. | |
| 2011/0224351 A1* | 9/2011 | Mori ..................... | C08F 253/00 525/279 |
| 2013/0165589 A1 | 6/2013 | Mruk et al. | |
| 2019/0241721 A1 | 8/2019 | Schmaunz-Hirsch et al. | |

FOREIGN PATENT DOCUMENTS

| | | |
|---|---|---|
| CN | 102239194 A | 11/2011 |
| CN | 103172809 A | 6/2013 |
| EP | 0606597 A1 | 7/1994 |
| EP | 3109064 A1 | 12/2016 |
| EP | 3103655 B1 | 7/2018 |
| EP | 3260304 B1 | 1/2020 |
| JP | H06206907 A | 7/1994 |
| JP | WO2010038835 A1 | 3/2012 |
| JP | 2013139563 A | 7/2013 |
| JP | 2015229689 A | 12/2015 |
| JP | 6161895 B2 | 7/2017 |
| KR | 101613752 B1 | 4/2016 |
| WO | 2010038835 A1 | 4/2010 |
| WO | 2015121224 A1 | 8/2015 |

OTHER PUBLICATIONS

Notice of Decision of Rejection dated Aug. 27, 2025 of counterpart Korean Application No. 10-2023-7011777.
JP Office Action dated Jan. 21, 2025 of counterpart Japanese Patent Application No. 2023-520383.
International Search Report dated Feb. 1, 2022 of International Application PCT/EP2021/078975 on which this application is based.
Chunzhao Li et al: A Versatile Method To Prepare RAFT Agent Anchored Substrates and the Preparation of PMMA Grafted Nanoparticles—vol. 39, No. 9, May 1, 2006, pp. 3175-3183.
Extended European Search Report dated Apr. 29, 2021 of priority application 20204276.8 of this application.
Request for the Submission of an Opinion dated Dec. 9, 2024 for the counterpart Korean Patent Application No. 10 2023 7011777 and machine translation of same.
CN Office Action dated Mar. 26, 2025 of counterpart CN application No. 202180072904.3.
JP Office Action drafted Apr. 26, 2024 mailed on May 1, 2024of counterpart Japanese Application No. 2023-5208383 and machine translation of same.

(Continued)

*Primary Examiner* — Deve V Hall

(74) *Attorney, Agent, or Firm* — Richard A. Wolf; Gregory Adams

(57) ABSTRACT

The present invention relates to a sulfur-crosslinkable rubber composition comprising a filler component in an amount in the range of 1 to 350 phr, and at least one graft copolymer having a modified diene rubber backbone and one or more oligomeric side chains grafted to the modified diene rubber backbone, wherein the oligomeric side chains are obtained through reversible addition fragmentation chain transfer polymerization of a monomer composition, and wherein the monomer composition comprises at least one polar monomer.

16 Claims, No Drawings

(56) References Cited

OTHER PUBLICATIONS

Decision of Rejection dated Apr. 29, 2926 of counterpart Chinese Application No. 202180072904.3.
CN Office action dated Nov. 15, 2025 of counterpart Chinese Application No. 202180072904.3.

* cited by examiner

SULFUR-CROSSLINKABLE RUBBER COMPOSITION COMPRISING A GRAFT COPOLYMER

The present invention relates to a sulfur-crosslinkable rubber composition, a sulfur-vulcanized rubber composition obtainable from the respective sulfur-crosslinkable rubber composition and a rubber product comprising said sulfur-vulcanized rubber composition as well as to the use of a graft copolymer having a modified diene rubber backbone and one or more oligomeric side chains grafted to the modified diene rubber backbone, in a sulfur-crosslinkable rubber composition for increasing the rolling resistance of vehicle tires produced from the sulfur-crosslinkable rubber composition.

The subject-matter of the present invention is defined in the claims.

Since the start of the twenty-first century, the automotive industry is one of the industrial branches that is facing the most fundamental challenges and is experiencing several disruptive technological advances. The growing customer awareness for ecological aspects like emission profiles or resource efficiency requires new concepts for mobility. At the same time, there is an ever-increasing demand for improved performance characteristics of vehicles as well as overall stricter regulations with respect to safety. Meeting these challenges is not only a task for vehicle manufacturers. In fact, several of these aspects are heavily influenced by the properties of the vehicle tires, making the optimization of tire properties a key objective.

Several relevant properties of pneumatic vehicle tires, e.g. rolling resistance and wet grip, are closely linked to the rubber composition of the tread. Therefore, a lot of research effort is focused on optimizing the properties of the rubber composition, wherein significant progress was made in recent years, e.g. the replacement of carbon black filler with silica. Unfortunately, a lot of different physical-chemical properties of vulcanized rubber compositions that are relevant for the running properties of tires cannot be altered independently of each other, resulting in trade-offs, wherein one property cannot be enhanced without adversely affecting another relevant property. For instance, an improvement in wet grip and dry breaking generally entails deterioration in rolling resistance, winter properties and abrasion characteristics. In consequence, the optimization of rubber compositions is oftentimes about resolving the trade-offs by developing solutions for increasing specific parameters without hampering the respective complementary properties too severely.

Several concepts for improving the properties of rubber compositions are known from the prior art, e.g. from U.S. Ser. No. 10/273,351 B2, EP 3103655 B1 and EP 3260304 B1. Due to its fundamental relevance for the properties of the rubber composition, a lot of attention is given to the optimization of the rubber compounds used in the rubber composition as well as the respective processes for rubber production, as e.g. disclosed in EP 3109064 A1, WO2015121224 and US 2013165589 A1. Herein, the affinity of the rubber compound to the filler material is an important factor, that governs the strength of the attractive interactions in the rubber composition and therefore influences the mechanical properties of the rubber composition.

Several of the rubber compounds that are most widely used in the technical field are typically produced using the living anionic type of polymerization. While allowing for a high degree of functionalization, this type of polymerization typically does not allow a wide range of monomers to be used. In particular, polar monomers, like e.g. acrylate monomers cannot be efficiently used in these polymerizations, generally resulting in rubber compounds with a low degree of polarity. This is often considered disadvantageous, in particular with respect to the filler affinity as rubber compounds essentially consisting of unpolar repeating units typically exhibit insufficient filler affinity.

In view of the above described background, there was a long-felt need to overcome the respective disadvantages of prior art rubber compositions and to provide a sulfur-crosslinkable rubber composition that after vulcanization exhibits excellent performance properties, in particular in the trade-off between rolling resistance and wet grip.

It was an additional objective of the present invention that the sulfur-crosslinkable rubber composition after vulcanization should have beneficial mechanical properties, in particular improved durability properties due to high stiffness.

Furthermore, it was an objective of the present invention to provide a sulfur-crosslinkable rubber composition that exhibits excellent filler affinity between the rubber compound and the filler used in the sulfur-crosslinkable rubber composition.

It was a secondary objective of the present invention to provide a sulfur-vulcanized rubber composition obtainable from the respective sulfur-crosslinkable rubber composition, a process of making said sulfur-vulcanized rubber composition and a rubber product comprising said sulfur-vulcanized rubber composition.

Likewise, it was an objective of the present invention to provide a use for a specific graft copolymer in sulfur-crosslinkable rubber compositions.

The above described objectives are solved by the subject-matter of the present invention. In particular, the inventors found that the above-described objectives can be solved if the advantages of the living anionic polymerization are combined with the benefits of reversible addition fragmentation chain transfer (RAFT) polymerization. Herein, an unpolar backbone produced by living anionic polymerization is combined with polar oligomeric side chains produced by RAFT polymerization that are grafted to the unpolar backbone to yield an improved rubber compound with a high degree of functionalization and high density of polar units, that shows high filler affinity and can be vulcanized to obtain a sulfur-vulcanized rubber composition having excellent performance characteristics, in particular good rolling resistance, improved winter performance and improved durability.

Hereinafter, the subject-matter of the invention is discussed in more detail, wherein preferred embodiments of the invention are disclosed. It is particularly preferred to combine two or more preferred embodiments to obtain an especially preferred embodiment. Correspondingly, especially preferred is a sulfur-crosslinkable rubber composition according to the invention, that defines two or more features of preferred embodiments of the present invention.

The present invention relates to a sulfur-crosslinkable rubber composition comprising

- a filler component in an amount in the range of 1 to 350 phr, and
- at least one graft copolymer having a modified diene rubber backbone and one or more oligomeric side chains grafted to the modified diene rubber backbone, wherein the oligomeric side chains are preferably polar oligomeric side chains, wherein the oligomeric side chains are obtained through reversible addition fragmentation chain transfer polymerization of a monomer composition, and wherein the monomer composition comprises at least one polar monomer.

The term "sulfur-crosslinkable" is well known to the skilled person and defines that the rubber composition of the present invention can be cured in the presence of sulfur, wherein the separate chains of the rubber compound are crosslinked, i.e. interconnected, to obtain a cured rubber composition, i.e. sulfur-vulcanized rubber composition. This process is known as vulcanization and the obtained product can be used to produce a broad variety of rubber products.

The rubber composition of the present invention comprises 1 to 350 phr of a filler component. The filler component comprises one or more filler materials, e.g. silica, carbon black, aluminosilicates, chalk, starch, magnesium oxide, titanium dioxide, rubber gels, graphite, graphene or carbon nanotubes.

The unit "phr" as used herein denotes "parts per hundred parts of rubber by weight" and is the standard unit used in the rubber industry to define the amounts of different components in a rubber composition. The respective amounts are given as parts by weight of the substance relative to the total mass of all high molecular weight rubbers present in the mixture that are solid at ambient conditions and constitute 100 phr.

The rubber composition of the present invention comprises at least one graft copolymer. As used herein, the term "copolymer" is understood to mean a polymer formed from two or more different monomers, i.e. monomers having a different chemical structure. The term "graft copolymer" defines that the respective copolymer is obtained by grafting oligomeric side chains to a backbone in a graft reaction, thereby modifying the backbone and resulting in a segmented graft copolymer with a backbone and randomly distributed branches of oligomeric side chains along the backbone. The backbone can for example be a linear or a branched backbone. Suitable graft reactions for obtaining graft copolymers are known to the skilled person.

The graft copolymer used in the rubber composition of the present invention has a modified diene rubber backbone, expressing that a diene rubber was used as backbone for the graft reaction. The term "diene rubber" as used herein refers to rubbers that arise through polymerization or copolymerization of dienes and/or cycloalkenes and that therefore comprise carbon-carbon double bonds. Exemplary diene rubbers are synthetic polyisoprene, polybutadiene (butadiene rubber; BR), styrene-butadiene copolymer (styrene-butadiene rubber; SBR).

The graft copolymer used in the rubber composition of the present invention has one or more oligomeric side chains grafted to it, i.e. at least one oligomeric side chain grafted to it. While the distinction between polymers and oligomers is not sharp, the term "oligomeric" indicates that the number of repeating units in the side chain is comparably small and is typically in the range of 2 to 400 units. While the graft copolymer used in the rubber composition of the present invention is not limited with respect to the grafting density, a sulfur-crosslinkable rubber composition is preferred, wherein the graft copolymer has an average grafting density expressed as number of side chains per modified diene rubber backbone, in the range of 1 to 10, preferably 2 to 8, most preferably 2 to 6.

In the graft copolymer of the present invention, the oligomeric side chains are obtained through reversible addition fragmentation chain transfer (RAFT) polymerization of a monomer composition. The RAFT polymerization is used mainly in biological applications due to the wide range of solvent and monomers that can be used, thereby enabling the usage of polar monomers and allowing for the efficient synthesis of highly polar oligomers. The concept of RAFT polymerization itself is known in the art and e.g. disclosed in EP 3109064 A1.

Due to the chemical nature of the RAFT agents typically employed in the RAFT polymerization, an oligomeric side chain obtained through RAFT polymerization can typically be identified due to being bound to the modified diene rubber backbone via a residue derived from a radical reactive functional group, preferably a sulfur atom, at one side and having a terminal group at the other side having the general structure $—CR_7R_8R_9$, wherein $R_7$, $R_8$ and $R_9$ are bound to the tertiary carbon and are independently selected from the group consisting of hydrogen, methyl group, phenyl group, cyano group and $—CO_2Et$ group.

Before being grafted to the modified diene rubber backbone, the oligomeric side chains obtained by RAFT polymerization typically comprise a radical reactive functional group capable of reacting with the modified diene rubber backbone in the presence of a radical initiator. For example, the radical reactive functional group may be a sulfur-containing functional group, preferably a thiol group, or an oxygen-containing functional group, preferably an alcohol group.

Therefore, in an alternative embodiment the graft copolymers can be defined without reference to the production through RAFT polymerization as graft copolymer having a modified diene rubber backbone and one or more oligomeric side chains grafted to the modified diene rubber backbone, wherein the oligomeric side chains are bound to the modified diene rubber backbone via a residue derived from a radical reactive functional group, preferably a sulfur atom, and comprise a terminal group having the general structure $—CR_7R_8R_9$, wherein $R_7$, $R_8$ and $R_9$ are each independently selected from the group consisting of hydrogen, methyl group, phenyl group, cyano group and $—CO_2Et$ group.

The oligomeric side chains used in the present invention are obtained from polymerization of a monomer composition comprising one or more monomers. Herein, the inventors found that it is important for solving the above objectives that the monomer composition comprises at least one polar monomer in order to utilize the advantages of the RAFT polymerization and to obtain oligomeric side chains with the desired degree of polarity.

Polar monomers as used herein are organic monomers that comprise at least one heteroatom, i.e. at least one atom that is neither carbon nor hydrogen, wherein polar monomers are preferred that comprise at least one C—X connectivity, i.e. a chemical connectivity between carbon and the heteroatom, wherein X is selected from the group consisting of boron, nitrogen, oxygen, sulfur, fluorine, chlorine, bromine and iodine and wherein the polar monomers preferably comprise no phosphorous atom. Suitable polar monomers are e.g. disclosed in US 20130165589 A1. The chemical chemical connectivity between carbon and the heteroatom can be a single bond, a double bond or a triple bond, wherein the polar monomer preferably comprises an ester function or an ether function. Suitable polar monomers are for example acrylates and methacrylates that comprise additional ester or ether functional groups.

In agreement with the understanding of the skilled person the term "at least one monomer" is not construed as referring to a single molecule of said monomer. Instead, the skilled person understands that the monomer composition comprises several monomers of the same chemical structure, e.g. an acrylate or a methacrylate. In other words, the skilled person understands that the monomer composition preferably comprises at least 1% by weight, more preferably at least 2% by weight, of the at least one polar monomer, with respect to the weight of the monomer composition. As a result of the RAFT polymerization of the monomer composition, polar oligomers are obtained that comprise repeating units that are derived through polymerization from the monomers and therefore comprise repeating units that are derived from the polar monomers.

With the sulfur-crosslinkable rubber compositions of the present invention, that show a high affinity between the graft copolymer and the filler, excellent performance properties can be obtained after vulcanization, in particular good rolling resistance and improved durability properties due to high stiffness.

The inventors found that particular good results can be obtained, if the oligomeric side chains themselves comprise two or more different repeating units along the chain. Without wishing to be bound by theory it is assumed that different repeating units of different chemical structure in the oligomeric chain allow for strong interaction with a wider range of compounds in the rubber composition, e.g. with different filler materials. For example, polar functional groups like amines could show strong interaction with polar groups on the filler surface, e.g. hydroxyl groups, while longer alkyl groups or phenyl groups could promote van-der-Waals interactions with unpolar compounds like carbon black.

Correspondingly, especially preferred is a sulfur-crosslinkable rubber composition according to the invention, wherein the monomer composition comprises at least two different monomers. Herein, the term “different monomers” again needs to be construed as meaning monomers of different chemical structure, e.g. an acrylate and a methacrylate.

It was found that particular good results can be obtained, if acrylates and/or methacrylates are used as polar monomers. Therefore, a sulfur-crosslinkable rubber composition is especially preferred, wherein the monomer composition comprises at least one acrylate or methacrylate monomer.

Acrylate and methacrylate monomers as used herein are the salts and esters of acrylic acid and methacrylic acid, respectively. Suitable acrylate and methacrylate monomers are e.g. disclosed in US 20130165589 A1 and are preferably selected from the list consisting of 2-(dimethylamino)ethyl methacrylate, 3-(dimethylamino)propyl methacrylate, 2-(diethylamino)ethyl methacrylate, or mixtures thereof.

More specifically, preferred is a sulfur-crosslinkable rubber composition according to the invention, wherein the monomer composition also comprises at least one unsaturated hydrocarbon monomer, preferably an aromatic hydrocarbon monomer with a vinyl moiety, wherein the monomer composition most preferably comprises 2-(dimethylamino) ethyl methacrylate and styrene in a combined amount of 50% or more by weight, preferably 70% or more by weight, most preferably 90% or more by weight, with respect to the weight of the monomer composition.

Other suitable unsaturated hydrocarbon monomers are e.g. disclosed in US 20130165589 A1, wherein the aromatic hydrocarbon monomer with a vinyl moiety is preferably selected from the list consisting of styrene, 2-methylstyrene, 3-methylstyrene, 4-methylstyrene, 4-propylstyrene, 1-vinylnaphthalene, 4-cyclohexylstyrene, 4-(p-methylphenyl) styrene, 1-vinyl-5-hexylnaphthalene, 3-(2-pyrrolidino ethyl) styrene, 4-(2-pyrrolidino ethyl)styrene and 3-(2-pyrrolidino-1-methyl ethyl)-2-methylstyrene.

The ratio of the respective repeating units in the oligomeric side chain can beneficially be controlled by the concentration of the monomers in the monomer composition. Therein, a sulfur-crosslinkable rubber composition according to the invention is preferred, wherein in the monomer composition the weight ratio of polar monomers to unsaturated hydrocarbon monomers is in the range of 10:1 to 1:10, preferably in the range of 5:1 to 1:5, most preferably in the range of 1:1 to 1:4.

As indicated above, it was found to be beneficial that the oligomeric side chains are short in comparison with the diene rubber, in particular in order to maintain a good processability of the graft copolymer. Therefore, a sulfur-crosslinkable rubber composition according to the invention is preferred, wherein the oligomeric side chains have a weight average molecular weight $M_w$ in the range of 350 g/mol to 40000 g/mol.

In the framework of the present invention, the weight-average molecular weight $M_w$ referred to above as well as the number-average molecular weight $M_n$ of the polymers and oligomers are determined by means of gel permeation chromatography (GPC) with tetrahydrofuran (THF) as eluent at 40° C. in accordance with BS ISO 11344:2004.

Taking into account the above information, a specific structure for the oligomeric side chains was identified by the inventors to be particular beneficial in sulfur-crosslinkable rubber compositions of the present invention. In particular, a sulfur-crosslinkable rubber composition according to the invention is preferred, wherein the oligomeric side chains have a general structure according to formula I):

I)

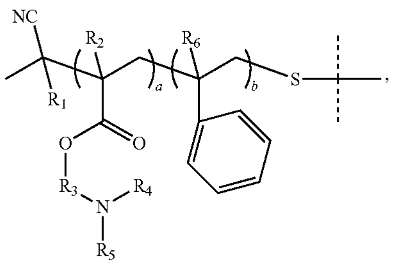

wherein $R_1$, $R_2$ and $R_6$ are each independently selected from the group consisting of hydrogen and alkyl groups having from 1 to 20 carbon atoms, $R_3$ is a substituted or unsubstituted alkyl chain having from 1 to 20 carbon atoms and $R_4$ and $R_5$ are each independently selected from the group consisting of substituted or unsubstituted alkyl groups having from 1 to 20 carbon atoms, substituted or unsubstituted cycloalkyl groups having from 3 to 20 carbon atoms and substituted or unsubstituted aryl groups having from 6 to 30 carbon atoms, wherein the repeating units preferably are statistically distributed in the oligomer chain and wherein a and b are each independently integers in the range of 1 to 400, wherein it is especially preferred, that the sum of a and b is in the range of 2 to 400.

Herein, the term “substituted” means that one or more hydrogen atoms of a respective group is substituted, i.e. replaced, with a specific substituent. Within the framework of the present invention, the substituents are independently selected from the group consisting of alkyl groups having from 1 to 20 carbon atoms, cycloalkyl groups having from 3 to 20 carbon atoms and an aryl groups having from 6 to 20 carbon atoms.

The substituted or unsubstituted alkyl chain having from 1 to 20 carbon atoms defined above describes a saturated hydrocarbon group that is connected to both the oxygen and the nitrogen atom in formula I.

While block copolymers could be preferred for certain applications, it is not required to use block copolymers. Correspondingly, the repeating units are preferably distributed statistically in the oligomer chain.

A generalized reaction scheme for arriving at the above defined oligomeric side chain that can be grafted to the diene rubber backbone is provided in reaction scheme A) below, wherein RI is the radical initiator, CTA is the chain transfer agent used in the RAFT polymerization and CTA" are the end groups derived from the chain transfer agent during RAFT polymerization.

A)

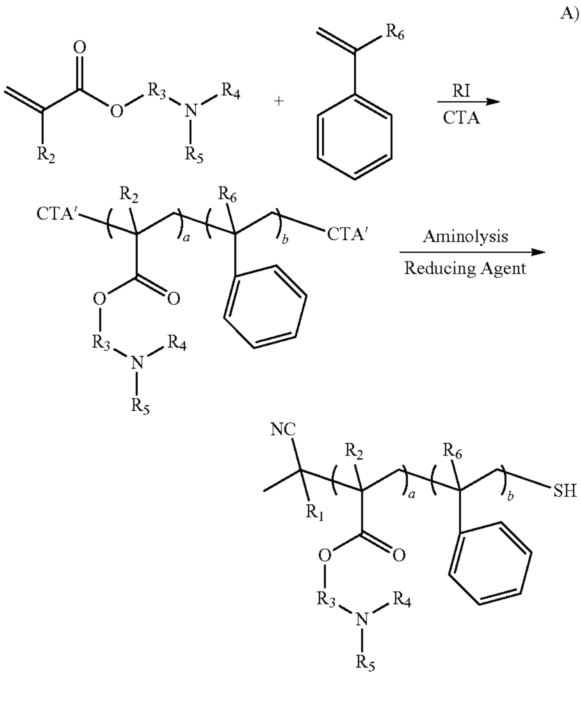

Especially preferred is a sulfur-crosslinkable rubber composition according to the invention, wherein in the above formula I) $R_1$, $R_2$, $R_4$ and $R_5$ are each independently selected from the group consisting of alkyl groups having from 1 to 10 carbon atoms, preferably 1 carbon atom, $R_3$ is an unsubstituted alkyl chain having from 1 to 10 carbon atoms, preferably 2 carbon atoms, $R_6$ is hydrogen and wherein a and b are each independently integers in the range of 2 to 50, wherein the oligomeric side chain preferably has an average value a in the range of 15 to 25, preferably 18 to 23, and an average value b in the range of 2 to 10, preferably 3 to 8.

In some cases, it was found that sulfur-crosslinkable rubber compositions according to the invention sometimes can exhibit less favorable properties compared to the unmodified diene rubber compound for specific applications from the perspective of processability, in particular if the increase in polydispersity during synthesis of the graft copolymer is large. The inventors found that in principal it is preferred to limit the increase in polydispersity, typically expressed as PD or PDI, during synthesis of the graft copolymer. As set out in more detail below, it was surprisingly found, that the increase in polydispersity during synthesis can be minimized if the radical initiator during the graft reaction is added to the reaction mixture in at least two separate steps. Due to this technical teaching, it is possible to obtain the graft copolymer with low polydispersity and to ensure good properties.

It was found that a sulfur-crosslinkable rubber composition according to the invention is preferred, wherein the graft copolymer has a polydispersity, calculated as the ratio $M_w/M_n$, in the range of 1.0 to 3.0, preferably 1.1 to 2.5, most preferably 1.2 to 2.0, and/or wherein the ratio of the polydispersity of the graft copolymer to the polydispersity of the unmodified diene rubber compound is in the range of 1 to 1.5, more preferably in the range of 1.05 to 1.2.

As a related aspect, a sulfur-crosslinkable rubber composition according to the invention in preferred, wherein the graft copolymer has a weight average molecular weight $M_w$ in the range of 350000 to 900000 g/mol, preferably in the range of 400000 to 800000 g/mol.

While the present invention is applicable to a wide variety of diene rubber compounds, excellent results were obtained for preferred sulfur-crosslinkable rubber compositions according to the invention, wherein the modified diene rubber backbone is obtained by living anionic polymerization, wherein the modified diene rubber backbone preferably is modified styrene-butadiene rubber.

Suitable monomers for the living anionic polymerization are e.g. 1,3-butadiene, 2,3-dimethyl-1,3-butadiene, piperylene, 3-butyl-1,3-octadiene, isoprene, 2-phenyl-1,3-butadiene, 2-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ethyl)-2-methylstyrene.

The styrene-butadiene rubber that is defined to be preferred can be either solution-polymerized styrene-butadiene rubber (SSBR) or emulsion-polymerized styrene-butadiene rubber (ESBR), and it is also possible to use a mixture of at least one SSBR and at least one ESBR. However, the usage of SSBR is preferred. The SSBR used can be end-functionalized.

The properties of the sulfur-crosslinkable rubber composition were found to be influenced by the choice of filler material used in the filler component, wherein excellent results were obtained with silica. Thus, a sulfur-crosslinkable rubber composition of the present invention is preferred comprising the filler component in an amount of 10 to 300 phr, preferably in an amount 20 to 250 phr, wherein the filler component preferably comprises silica and/or carbon black, most preferably silica.

In the above embodiment, it is preferred that the filler component comprises silica in an amount of 90% or more, preferably 95% or more, most preferably 98% or more, by weight with respect to the weight of the filler component. Suitable silicas are known to the skilled person and e.g. disclosed in U.S. Ser. No. 10/273,351 A1. Especially preferred is a sulfur-crosslinkable rubber composition according to the invention, wherein the filler component comprises silica and carbon black, preferably in a weight ratio of 100:1 to 1:100, wherein the filler component preferably comprises at least 0.01 phr carbon black.

The sulfur-crosslinkable rubber composition according to the invention can comprise other diene rubber compounds. Exemplary diene rubbers are natural or synthetic polyisoprene, polybutadiene (butadiene rubber; BR), styrene-butadiene copolymer (styrene-butadiene rubber; SBR).

The sulfur-crosslinkable rubber composition according to the invention can comprise other typical additives known for rubber compositions, including plasticizers, aging stabilizers, activators, waxes, masticating aids, processing aids and bonding systems. Typical examples for respective additives are e.g. disclosed in U.S. Ser. No. 10/273,351 A1. The overall amount of the respective additives is typically in the range of 3 to 300 phr, preferably 3 to 200 phr, more preferably 5 to 150 phr.

The invention also relates to a sulfur-vulcanized rubber composition obtainable through sulfur-vulcanization of a sulfur-crosslinkable rubber composition according to the invention.

The vulcanization of the sulfur-crosslinkable rubber composition is conducted in the presence of sulfur and/or sulfur donors, wherein typically vulcanization accelerators are added, wherein some vulcanization accelerators can also act as sulfur donors. Likewise, it can be expedient to use vulcanization retarders. Examples for the respective compounds are known to the skilled person and e.g. disclosed in U.S. Ser. No. 10/273,351 A1.

Typically, the vulcanization system or cure package, e.g. the sulfur source and the vulcanization-influencing substances, is added to the prepared sulfur-crosslinkable rubber composition under mixing followed by optional process steps. Vulcanization itself is typically conducted at elevated temperatures, wherein suitable process parameters are well established in the industry.

In view of the above, the invention also relates to the use of a sulfur-crosslinkable rubber composition according to the invention for obtaining a sulfur-vulcanized rubber composition through vulcanization.

Likewise, a process for making a sulfur-crosslinkable rubber composition or a sulfur-vulcanized rubber composition is disclosed, comprising the steps:

- providing or producing a diene rubber compound, preferably solution styrene-butadiene rubber,
- polymerizing a monomer composition comprising at least one polar monomer in the presence of a RAFT agent for producing oligomers with a terminal functional group,
- grafting the polar oligomers to the diene rubber compound in the presence of a radical initiator in a reaction mixture for producing a graft copolymer having a modified diene rubber backbone and one or more oligomeric side chains grafted to the modified diene rubber backbone, wherein the radical initiator is added to the reaction mixture in at least two separate steps, wherein the total amount of radical initiator added to the reaction mixture is in the range of 0.1 to 1.0% by weight with respect to the weight of the diene rubber compound in the reaction mixture,
- mixing the graft copolymer with a filler component for obtaining a sulfur-crosslinkable rubber composition, and optionally
- mixing the sulfur-crosslinkable rubber composition with sulfur and/or a sulfur source and vulcanizing the sulfur-crosslinkable rubber composition for producing a sulfur-vulcanized rubber composition, wherein other components can optionally be added to the mixture in order to facilitate the vulcanization.

In the above process, it is very characteristic that the radical initiator during the grafting step is added to the reaction mixture in at least two separate steps, i.e. the graft reaction is performed by injecting the radical initiator in at least two installments. This means that the reaction is allowed to proceed for at least several minutes after the addition of the first portion of the radical initiator before the second or subsequent portions of the radical initiator are added to the reaction mixture. As described above, the inventors surprisingly found that the graft copolymer can be obtained without an undesirable large increase in the polydispersity, i.e. the ratio of $M_w$ to $M_n$, if the above protocol is used.

Therefore, the above process is preferred, wherein the ratio of the polydispersity of the graft copolymer to the polydispersity of the diene rubber compound is in the range of 1 to 1.5, more preferably in the range of 1.05 to 1.2.

Having arrived at the sulfur-vulcanized rubber composition of the present invention, the present invention naturally also relates to a rubber product, preferably vehicle tire, comprising the sulfur-vulcanized rubber composition according to the invention and the respective use of a sulfur-crosslinkable rubber composition according to the invention or a sulfur-vulcanized rubber composition according to the invention in the production of rubber products, preferably vehicle tires.

While the sulfur-vulcanized rubber composition of the present invention is suitable for a broad variety of rubber products, e.g. bellows, conveyor belts, air springs, breaker belts or shoe soles, its most prominent use that utilizes the excellent performance characteristics the most, is the usage in vehicle tires. Herein, the term "vehicle tires" comprises pneumatic vehicle tires and solid rubber tires for all types of vehicles, including e.g. trucks and bicycle tires, wherein pneumatic vehicle tires are specially preferred.

Finally, the present invention also relates to the use of a graft copolymer having a modified diene rubber backbone and one or more oligomeric side chains grafted to the modified diene rubber backbone, in a sulfur-crosslinkable rubber composition according to the invention, i.e. a sulfur-crosslinkable rubber composition comprising a filler component in an amount of 1 to 350 phr for increasing the rolling resistance of vehicle tires produced from the sulfur-crosslinkable rubber composition, wherein the oligomeric side chains are obtained through reversible addition fragmentation chain transfer polymerization of a monomer composition, wherein the monomer composition comprises at least one polar monomer.

Hereinafter, the invention is described in more detail by means of experiments.

In a first step, the precursors for the oligomeric side chains having the formula II) were polymerized using RAFT polymerization.

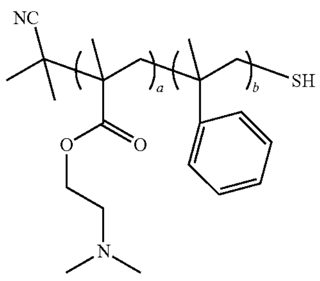

II)

PREPARATION EXAMPLE 1 (OLIGOMER 20%)

28 mL of 0.2 M 2,2-azobis(isobutyronitrile) (AIBN) and 5 g of 2-cyano-2-propyl benzodithioate (CPDB) were provided in a 500 mL, round-bottom flask and 21.7 g of 2-(dimethylamino)ethyl methacrylate, 84.9 g of styrene and 95 mL of toluene were added thereto, followed by reacting at 80° C. for 30 hours, precipitating in a solvent, and separating. The solid thus separated was dissolved again in toluene, and 33 g of hexylamine and 2.8 g of a reducing agent were added thereto at room temperature (25° C.), followed by stirring for 30 minutes. After that, the resultant product was precipitated in cold hexane to prepare an oligomer represented by Formula II) below. Successful synthesis of the oligomer of formula II) was confirmed through $^1$H-NMR. Average a is 23 and average b is 3.

PREPARATION EXAMPLE 2 (OLIGOMER 40%)

An oligomer of formula II) was prepared by performing the same method as in Preparation Example 1 except for adding 43.3 g of 2-(dimethylamino)ethyl methacrylate and 63.7 g of styrene instead. Successful synthesis of the oligomer of formula II) was confirmed through $^1$H-NMR. Average a is 18 and average b is 8.

In a second step, the precursors for the oligomeric side chains were grafted to the diene rubber backbone.

PREPARATION EXAMPLE 3

440 g of styrene-butadiene rubber, 2.49 kg of n-hexane, and 5.8 kg of tetrahydrofuran were introduced into a 20 L reactor, and the mixture was purged under a nitrogen atmosphere. 330 g of the oligomer solution (20 wt % in tetrahydrofuran) obtained in Preparation Example 1 was added, and internal temperature of reactor was adjusted to 90° C. 35.2 g of lauroyl peroxide solution (2.5%) was added to initiate the reaction. After 1 hour, 35.2 g of the solution was added again, and another hour later, 17.6 g of the solution was added one more time. After 1 hour, a small amount of ethanol was added to stop the reaction, and the reaction mixture was poured into acetone to obtain a rubber, followed by addition of antioxidant.

The styrene-butadiene rubber used in Preparation Example 3 was prepared as described below.

5 kg of n-hexane, 211 g of styrene, 769 g of 1,3-butadiene and 0.98 g of 2,2-di(2-tetrahydrofuryl)propane as a polar additive and 0.25 g n-buthyllithium were injected into a 20 L reactor, the internal temperature of the reactor adjusted to 60° C. and adiabatic reaction with heating was performed ([DTP]:[act. Li]=1.5:1 mol). After 30 minutes, 20 g of 1,3-butadiene was injected for capping the terminals of the polymer chains with butadiene. Then, the polymerization reaction was quenched by using ethanol, and 33 g of a solution in which 30 wt % of 2,6-di(alkylthiomethyl) substituted phenols (Wingstay K) was dissolved in hexane as an antioxidant, was added thereto. The obtained polymerization product was added to hot water (heated using steam) and stirred to remove solvents and to prepare the styrene-butadiene copolymer.

PREPARATION EXAMPLE 4

440 g of styrene-butadiene rubber, 2.49 kg of n-hexane, and 5.8 kg of tetrahydrofuran were introduced into a 20 L reactor, and the mixture was purged under a nitrogen atmosphere. 550 g of the oligomer solution (20 wt % in tetrahydrofuran) obtained in Preparation Example 1 was added, and internal temperature of reactor was adjusted to 90° C. 35.2 g of lauroyl peroxide solution (2.5%) was added to initiate the reaction. After 1 hour, 35.2 g of the solution was added again, and another hour later, 17.6 g of the solution was added one more time. After 1 hour, a small amount of ethanol was added to stop the reaction, and the reaction mixture was poured into acetone to obtain a rubber, followed by addition of antioxidant.

The styrene-butadiene rubber used in Preparation Example 4 was prepared as described below.

4 kg of n-hexane, 162 g of styrene, 595 g of 1,3-butadiene and 0.98 g of 2,2-di(2-tetrahydrofuryl)propane as a polar additive and 0.25 g n-buthyllithium were injected into a 20 L reactor, the internal temperature of the reactor adjusted to 60° C. and adiabatic reaction with heating was performed ([DTP]:[act. Li]=1.5:1 mol). After 30 minutes, 20 g of 1,3-butadiene was injected for capping the terminals of the polymer chains with butadiene. Then, the polymerization reaction was quenched by using ethanol, and 33 g of a solution in which 30 wt % of 2,6-di(alkylthiomethyl) substituted phenols (Wingstay K) was dissolved in hexane as an antioxidant, was added thereto. The obtained polymerization product was added to hot water (heated using steam) and stirred to remove solvents and to prepare the styrene-butadiene copolymer.

PREPARATION EXAMPLE 5

A modified styrene-butadiene copolymer was prepared by performing the same method as in Preparation Example 4 except for using the oligomer prepared in Preparation Example 2.

The styrene-butadiene rubber used in Preparation Example 5 was prepared as described for Preparation Example 4.

PREPARATION EXAMPLE 6

Styrene-butadiene rubber prepared as described for Preparation Example 3 was used as a rubber compound for the comparative experiment.

PREPARATION EXAMPLE 7

Styrene-butadiene rubber prepared as described for Preparation Example 4 was used as a rubber compound for the comparative experiment.

EXAMPLES

Rubber compositions were prepared from the rubber compounds prepared under Preparation Examples 3, 4 and 5 (according to the invention; Ex. 1, Ex. 2 and Ex. 3) 6 and 7 (comparative experiment; Comp. 1 and Comp. 2).

The rubber compositions were produced by a process customary in the rubber industry under standard conditions in two stages in a laboratory mixer, in which all the constituents apart from the vulcanization system (sulfur and vulcanization-influencing substances) were first mixed in the first mixing stage (base-mixing stage). By addition of the vulcanization system in the second stage (ready-mixing stage), the finished mixture was produced, with mixing at 90 to 120° C. The composition of the samples are disclosed in table 1.

Herein silica is Ultrasil VN3 silica provided by Evonik. The same set of typical plasticizer, additives and accelerators was used for all experiments in order to allow for a good comparability of the results.

The sulfur-crosslinkable rubber compositions were used to produce test specimens by vulcanization after 20 minutes under pressure at 160° C. These test specimens were used to determine material properties that are typical for the rubber industry by the test methods specified hereinafter.

rebound resilience at 70° C. according to DIN 53 512 (resilience 70° C.);

modulus at 200% elongation at RT according to DIN 53 504 (M200);

mean dynamic storage modulus from dynamic mechanic measurements at 55° C. according to DIN 53 513; Eplexor DKF 55° C. (E'mean); and loss factor tangens delta max at 55° C. as maximum value of the strain sweep from dynamic-mechanic measurement according to DIN 53513 (tan d (max).

Unless noted otherwise, measurements were conducted according to the technical standards in their most recent version as of June 2018.

The results obtained for the sulfur cross-linkable rubber composition and the sulfur-vulcanized rubber composition, respectively, are summarized in table 2 below.

TABLE 1

| Constituents | Unit | Comp. 1 | Comp. 2 | Ex. 1 | Ex. 2 | Ex. 3 |
|---|---|---|---|---|---|---|
| Natural rubber | phr | 10 | 10 | 10 | 10 | 10 |
| Preparation Example 3 | phr | — | — | 90 | — | — |
| Preparation Example 4 | phr | — | — | — | 90 | — |
| Preparation Example 5 | phr | — | — | — | — | 90 |
| Preparation Example 6 | phr | 90 | — | — | — | — |
| Preparation Example 7 | phr | — | 90 | — | — | — |
| Silica | phr | 95 | 95 | 95 | 95 | 95 |
| Plasticizer | phr | 35 | 35 | 35 | 35 | 35 |
| Additives | phr | 15.8 | 15.8 | 15.8 | 15.8 | 15.8 |
| Accelerator | phr | 4 | 4 | 4 | 4 | 4 |
| Sulfur | phr | 2 | 2 | 2 | 2 | 2 |

TABLE 2

| Parameter | Unit | Comp. 1 | Comp. 2 | Ex. 1 | Ex. 2 | Ex. 3 |
|---|---|---|---|---|---|---|
| Tg | ° C. | −21 | −21 | −22 | −20 | −20 |
| $M_W$ | kg/mol | 540 | 540 | 475 | 477 | 465 |
| PDI | — | 1.60 | 1.60 | 1.62 | 1.67 | 1.68 |
| Oligomers per chain | Units/chain | — | — | 2 | 4 | 4 |
| M200 | MPa | 7.3 | 5.9 | 9.2 | 9.1 | 10.4 |
| E'mean | MPa | 8.7 | 7.5 | 13.8 | 13.7 | 16.3 |
| resilience 70° C. | % | 53 | 56 | 55 | 57 | 58 |
| tan d (max) | — | 0.163 | 0.154 | 0.145 | 0.146 | 0.144 |

From the above data it is apparent to the skilled person, that excellent rolling resistance can be obtained with the rubber compositions of the present invention, as indicated by high values for resilience 70° C. and low values for the loss factor tan d (max) that were found for both grafting densities, i.e. 2 and 4 oligomers per chain. Furthermore, good values were observed for M200 and E'mean indicating that the sulfur-vulcanized rubber compositions of the present invention have excellent mechanical properties, in particular improved durability properties and high stiffness. The results indicate, that the graft copolymer shows excellent filler affinity.

The invention claimed is:

1. Sulfur-crosslinkable rubber composition comprising:

a filler component in an amount in the range of 1 to 350 phr, at least one graft copolymer having a modified diene rubber backbone and one or more oligomeric side chains grafted to the modified diene rubber backbone, and wherein the oligomeric side chains are obtained through reversible addition fragmentation chain transfer polymerization of a monomer composition, and wherein the monomer composition comprises at least one polar monomer, wherein the monomer composition comprises at least one methacrylate monomer, as at least one polar monomer, and the monomer composition comprises at least one aromatic hydrocarbon monomer with a vinyl moiety, as at least one unsaturated hydrocarbon monomer, wherein the at least one methacrylate monomer includes 2-(dimethylamino)ethyl methacrylate and the at least one aromatic hydrocarbon monomer with a vinyl moiety includes styrene, the 2-(dimethylamino)ethyl methacrylate and styrene being present in a combined amount of 50% or more by weight, with respect to the weight of the monomer composition.

2. Sulfur-crosslinkable rubber composition according to claim 1, wherein in the monomer composition the weight ratio of polar monomers to unsaturated hydrocarbon monomers is in the range of 5:1 to 1:5.

3. Sulfur-crosslinkable rubber composition according to claim 1, wherein the oligomeric side chains have a weight average molecular weight Mw in the range of 350 g/mol to 40000 g/mol.

4. Sulfur-crosslinkable rubber composition according to claim 1, wherein the oligomeric side chains have a general structure according to formula I):

formula I)

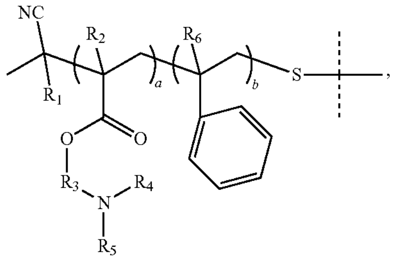

wherein R1, R2 and R6 are each independently selected from the group consisting of hydrogen and alkyl groups having from 1 to 20 carbon atoms, R3 is a substituted or unsubstituted alkyl chain having from 1 to 20 carbon atoms and R4 and R5 are each independently selected from the group consisting of substituted or unsubstituted alkyl groups having from 1 to 20 carbon atoms, substituted or unsubstituted cycloalkyl groups having from 3 to 20 carbon atoms and substituted or unsubstituted aryl groups having from 6 to 30 carbon atoms, wherein the repeating units are statistically distributed in the oligomer chain and wherein a and b are each independently integers in the range of 1 to 200.

5. Sulfur-crosslinkable rubber composition according to claim 4, wherein R1, R2, R4 and R5 are each independently selected from the group consisting of alkyl groups having 1 carbon atom, R3 is an unsubstituted alkyl chain having 2 carbon atoms, R6 is hydrogen and wherein a and b are each independently integers in the range of 2 to 50, wherein the oligomeric side chain has an average value a in the range of 18 to 23, and an average value b in the range of 3 to 8.

6. Sulfur-crosslinkable rubber composition according to claim 1, wherein the graft copolymer has an average grafting density expressed as number of side chains per modified diene rubber backbone, in the range of 2 to 8.

7. Sulfur-crosslinkable rubber composition according to claim 1, wherein the graft copolymer has a polydispersity in the range of 1.1 to 2.5, and wherein the ratio of the polydispersity of the graft copolymer to the polydispersity of the unmodified diene rubber compound is in the range of 1 to 1.5.

8. Sulfur-crosslinkable rubber composition according to claim 1, wherein the graft copolymer has a weight average molecular weight Mw in the range of 400000 to 800000 g/mol.

9. Sulfur-crosslinkable rubber composition according to claim 1, wherein the modified diene rubber backbone is obtained by living anionic polymerization, wherein the modified diene rubber backbone is modified styrene-butadiene rubber.

10. Sulfur-crosslinkable rubber composition according to claim 1, comprising the filler component in an amount of 10 to 300 phr, wherein the filler component comprises silica and/or carbon black.

11. Sulfur-vulcanized rubber composition obtainable through sulfur-vulcanization of a sulfur-crosslinkable rubber composition according to claim 1.

12. Vehicle tire, comprising the sulfur-vulcanized rubber composition according to claim 11.

13. A method of using graft copolymer having a modified diene rubber backbone and one or more oligomeric side chains grafted to the modified diene rubber backbone, comprising: providing the graft copolymer and using the graft copolymer in a sulfur-crosslinkable rubber composition according to claim 1, for increasing the rolling resistance of vehicle tires produced from the sulfur-crosslinkable rubber composition, wherein the oligomeric side chains are obtained through reversible addition fragmentation chain transfer polymerization of a monomer composition, wherein the monomer composition comprises at least one polar monomer.

14. Sulfur-crosslinkable rubber composition according to claim 1, wherein in the monomer composition the weight ratio of polar monomers to unsaturated hydrocarbon monomers is in the range of 4:1 to 1:4.

15. Sulfur-crosslinkable rubber composition according to claim 14, wherein the number of repeating units in the side chain is in the range of 2 to 400 units, the graft copolymer has a polydispersity in the range of 1.2 to 2.0, and wherein the ratio of the polydispersity of the graft copolymer to the polydispersity of the unmodified diene rubber compound is in the range of 1.05 to 1.2.

16. Sulfur-crosslinkable rubber composition according to claim 1, wherein the filler component comprises silica in an amount of 90% or more by weight with respect to the weight of the filler component.

* * * * *